United States Patent
Park et al.

(10) Patent No.: US 9,533,574 B2
(45) Date of Patent: Jan. 3, 2017

(54) SPEED CONTROL SYSTEM AND SPEED CONTROL METHOD FOR CURVED ROAD SECTION

(71) Applicant: MANDO CORPORATION, Pyeongtaek-si, Gyeonggi-do (KR)

(72) Inventors: Man Bok Park, Seoul (KR); Sang Hyun Lee, Seongnam-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/874,474

(22) Filed: Oct. 5, 2015

(65) Prior Publication Data

US 2016/0096430 A1   Apr. 7, 2016

(30) Foreign Application Priority Data

Oct. 6, 2014   (KR) ........................ 10-2014-0134305

(51) Int. Cl.
*B60K 31/00* (2006.01)
*G01P 1/10* (2006.01)

(52) U.S. Cl.
CPC ........... *B60K 31/0066* (2013.01); *G01P 1/103* (2013.01); *B60K 2031/0091* (2013.01)

(58) Field of Classification Search
CPC ..... B60K 31/0066; G01P 1/103; G06F 165/00
See application file for complete search history.

(56) References Cited

U.S. PATENT DOCUMENTS

| 6,317,683 B1 * | 11/2001 | Ciprian ................. G01C 21/30 701/118 |
| 2005/0218718 A1 * | 10/2005 | Iwatsuki ............... B60T 8/1766 303/177 |

(Continued)

FOREIGN PATENT DOCUMENTS

| JP | 2001257663 A | 9/2001 |
| JP | 2014052851 A | 3/2014 |
| KR | 20050036222 A | 4/2005 |

OTHER PUBLICATIONS

Korean Office Action corresponding to Korean Patent Application No. 10-2014-0134305 issued on Oct. 19, 2015.

*Primary Examiner* — Thomas Tarcza
*Assistant Examiner* — Alex C Dunn
(74) *Attorney, Agent, or Firm* — Hauptman Ham, LLP

(57) ABSTRACT

Disclosed is a speed control system for a curved road section, which includes: a wireless communication module that supports communication with road-side units and receives road information from the road-side units for a plurality of points on a curved road adjacent to the road-side units; an allowable speed calculation unit that calculates maximum allowable speeds that are the highest speeds at which a vehicle is driven, for the plurality of points, using the road information; an optimum speed calculation unit that calculates an optimum speed in an acceleration and deceleration range that is set in consideration of a predetermined acceleration and deceleration limit of the vehicle; and a control module that displays the optimum speed calculated by the optimum speed calculation unit to the outside, or provides the calculated optimum speed to another control system in the vehicle such that the speed of the vehicle is controlled.

10 Claims, 5 Drawing Sheets

(56) References Cited

U.S. PATENT DOCUMENTS

| | | | |
|---|---|---|---|
| 2009/0259357 A1* | 10/2009 | Aoki | B60K 37/06 |
| | | | 701/31.4 |
| 2011/0106442 A1* | 5/2011 | Desai | G01S 5/0072 |
| | | | 701/532 |
| 2011/0301844 A1* | 12/2011 | Aono | G01S 13/931 |
| | | | 701/300 |
| 2014/0012469 A1* | 1/2014 | Kunihiro | B60W 40/072 |
| | | | 701/41 |
| 2014/0195068 A1* | 7/2014 | Boss | G06F 19/00 |
| | | | 701/1 |

* cited by examiner

SPEED CONTROL SYSTEM AND SPEED CONTROL METHOD FOR CURVED ROAD SECTION

CROSS-REFERENCE TO RELATED APPLICATION

This application claims priority from and the benefit under 35 U.S.C. §119(a) of Korean Patent Application No. 10-2014-0134305, filed on Oct. 6, 2014, which is hereby incorporated by reference for all purposes as if fully set forth herein.

BACKGROUND OF THE INVENTION

1. Field of the Invention

The present invention relates to a speed control system for a curved road section, and more particularly to a technology that calculates the maximum allowable speed and an optimum speed on a curved road using information that is provided by a road-side unit and the like in order to provide them to the driver or to automatically control a vehicle's speed so that the vehicle can be stably driven and the safety of the driver can be guaranteed on a curved road section.

2. Description of the Prior Art

In modern societies, as the use of vehicles has been sharply increasing, hundreds of millions of people die or are injured due to vehicle accidents every year. Accordingly, various vehicle technologies have been developed to reduce injuries caused by traffic accidents and economic losses. The technologies include the Automatic Cruise Control (ACC) technology, the Lane Change Assistance technology, the Lane Departure Warning technology, and the Parking Assistance technology.

However, because the technologies use sensors, cameras, or the like mounted on the vehicles, the search range is restricted and the effects thereof are limited. Accordingly, technologies for recognizing a driving environment in a wider range have appeared. One of them is the V2X technology. V2X is the acronym for Vehicle to Everything, and includes V2V (Vehicle to Vehicle), V2I (Vehicle to Infrastructure), and V2N (Vehicle to Nomadice). Here, the infrastructure includes a Road-Side Unit (RSU) that is installed on a roadside to communicate with the vehicles. The vehicles communicate with the road-side units installed near the roads to form a network and receive various information from the road-side units to guarantee traffic safety, guide roads and provide information such as various multimedia contents, and to prevent traffic jams.

Meanwhile, the speed of the vehicle should be accelerated or decelerated according to the curving degree of the road on a curved road while the vehicle is being driven, and it is difficult to properly accelerate and decelerate the speed of the vehicle because the field of vision is small due to the characteristics of the curved road. Accordingly, a prompt determination ability and a driving performance of the driver are required to maintain a safe speed on a curved road. Accordingly, in order to guarantee the safety of the vehicle on a curved road, it is necessary to provide proper information to adjust the speed of the vehicle to the driver using the road-side units by which a driving environment in a relatively wide range can be recognized.

SUMMARY OF THE INVENTION

The present invention provides a speed control system for a curved road section for calculating a maximum allowable speed and an optimum speed on a curved road using information provided by a road-side unit and the like in order to provide them to the driver or to automatically control a vehicle's speed so that the vehicle can be stably driven and the safety of the driver can be guaranteed on a curved road section.

In accordance with an aspect of the present invention, there is provided a speed control system for a curved road section, including: a wireless communication module that supports communication with road-side units and receives, from the road-side units, road information for a plurality of points on a curved road that is adjacent to the road-side units; an allowable speed calculation unit that calculates the maximum allowable speeds that are the highest speeds at which a vehicle is driven, for the plurality of points, using the road information; an optimum speed calculation unit that calculates an optimum speed of the speed in an acceleration and deceleration range that is set in consideration of a predetermined acceleration and deceleration limit of the vehicle; and a control module that displays the optimum speed calculated by the optimum speed calculation unit to the outside or provide the calculated optimum speed to another control system in the vehicle such that the speed of the vehicle is controlled.

In accordance with another aspect of the present invention, there is provided a speed control method for a curved road section, including: receiving road information for a plurality of points on a curved road that is adjacent to road-side units, from the road-side units; calculating maximum allowable speeds at the plurality of points; calculating an optimum speed of the vehicle in an acceleration and deceleration range that is set in consideration of a predetermined acceleration and deceleration limit of the vehicle; and controlling the vehicle such that the speed of the vehicle is changed by displaying the optimum speed to the outside or by providing the optimum speed to another control system in the vehicle.

The speed control system for a curved road section according to the present invention receives the curve information of a curved road section using the roadside units, calculates maximum allowable speeds at which the vehicle may be driven in the curve sections using the information, and calculates optimum speeds that do not exceed the maximum allowable speeds so that the vehicle can be stably driven in a curve section. Accordingly, the vehicle can be stably driven and the driver can feel safe and comfortable while the vehicle is driven.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
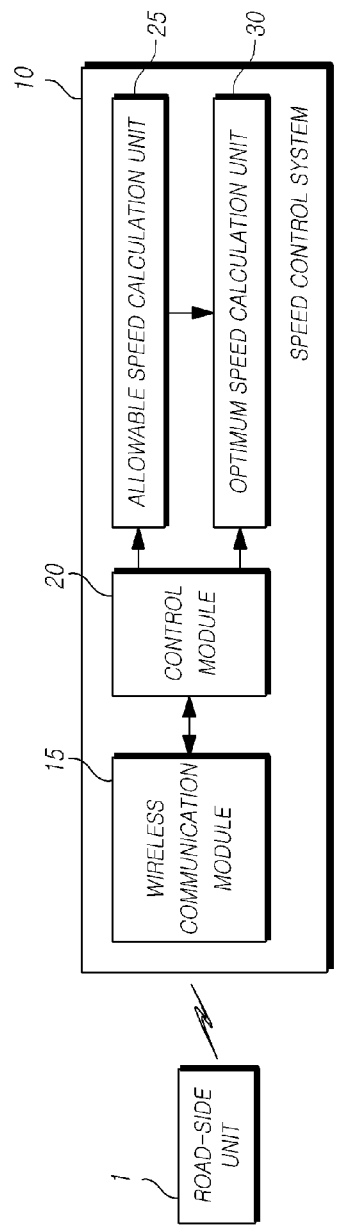
FIG. 1 is a block diagram of a speed control system for a curved road section according to the present invention.
Figure 2:
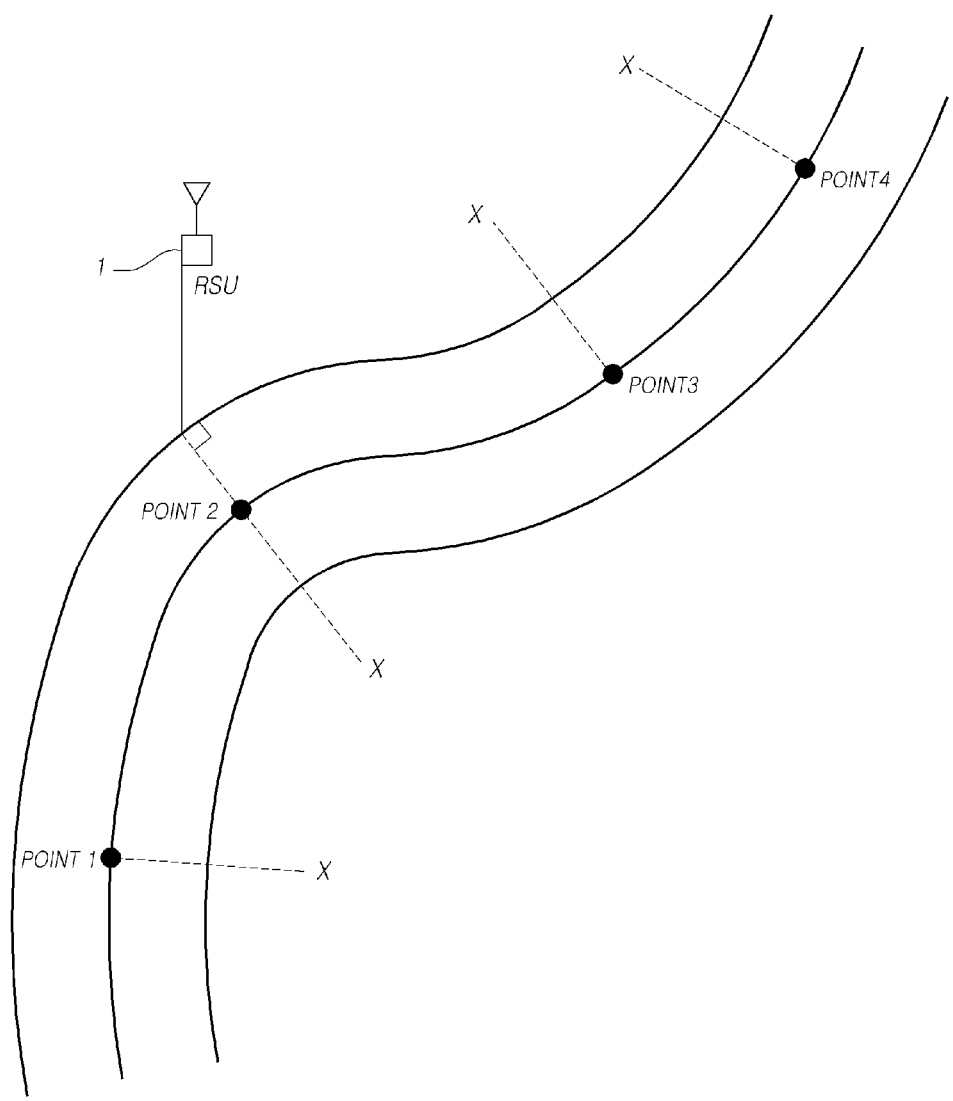
FIG. 2 is an exemplary view of a curved road section.

Hereinafter, some embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component. FIG. 1 is a block diagram of a speed control system for a curved road section according to the present invention. FIG. 2 is an exemplary view of a curved road section.

The speed control system 10 for a curved road section according to the present invention calculates a maximum allowable speed at which the vehicle may be driven in a curved section using information provided by a road-side unit 1, and calculates an optimum speed at which the vehicle can be optimally driven based on the calculated maximum allowable speed so that the vehicle may be guided to be driven at an optimum speed and thus be safely driven.

The speed control system 10 for a curved road section may include a wireless communication module 15 for wireless communication with an external device, such as a road-side unit 1, an allowable speed calculation unit 25 that calculates maximum allowable speeds of the vehicle at points of a curved road using information provided by the road-side unit 1, an optimum speed calculation unit 30 that calculates an optimum speed that does not exceed the maximum allowable speed in consideration of the preset limits of an acceleration and a deceleration of the vehicle, and a control module 20 that controls operations of the components including the wireless communication module 15, and generates a command signal such that the driving of the vehicle may be controlled according to the optimum speed.

Meanwhile, it has been described that an example of an external device that may provide necessary information to the speed control system while communicating with the speed control system 10 is the road-side unit 1, but the present invention is not limited thereto and the external device includes all types of vehicles that provide road information (an altitude and an latitude, radius information, and the like) necessary for calculating a maximum allowable speed according to the present invention.

The wireless communication module 15 supports a communication method for wireless communication with the road-side unit 1, and the road-side unit 1 and the wireless communication module 15 may communicate with each other in a short-range dedicated high-speed packet communication scheme called Dedicated Short Range Communication (DSRC). The DSRC communication scheme uses a bidirectional short range communication between the road-side unit 1 and the wireless communication module 15, a one-to-multiple communication function, a communication environment that may maintain a line of sight, a high speed transmission function, and an inexpensive and simple modulation technology.

The wireless communication module 15 receives information on latitudes, altitudes, and radii of a plurality of points from the road-side unit 1 while communicating with the road-side unit 1, and the corresponding information is provided to the allowable speed calculation unit 25. Here, the plurality of points are points located within a predetermined radius from the road-side unit 1, and may be points of which radii are changed on a curved road.

When the road-side unit 1 selects the points, it selects a location of a roadside where the radius thereof is changed on a curved road, draws a vertical line towards the center of the road from the location of the roadside that corresponds to the radius, and determines the location point where the vertical line and the center line of the road meet.

Among the information provided by the road-side unit 1, the information of the radius represents a degree by which the curved road is curved and may have a value of (+) or (−) according to the curving direction at the point. For example, as illustrated in FIG. 2, the curved road at point 1 and point 2 are curved rightwards and is indicated by (+) and the curved road at point 3 and point are curved leftwards and is indicated by (−). In contrast, the radii of point 1 and point 2 may be indicated by (−), and the radii of point 3 and point 4 may be indicated by (+). The radius information may be contained in a data packet of 16 bits.

Meanwhile, the latitudes and altitudes are necessary to determine a location and a curving degree of a curved road, and may be contained in data packets of 32 bits, respectively.

The wireless communication module 15 may receive information regarding the number of points that are provided to the vehicle from the road side unit 1, together with information on the latitudes, altitudes, and radii from the road-side unit 1. Accordingly, the control module 20 may compare the number of information elements that have been actually received from the road-side unit 1 with the number of points provided by the road-side unit 1 and may determine whether information on all the points has been received.

In general, because the range that may be detected by the road-side unit 1 has been determined, it may be predicted how much the curved road changes according to the number of the points detected by the road-side unit 1. That is, if the number of points detected by the road-side unit 1 is larger, it may be predicted that the curved road is severely changed.

The road-side units 1 are communication devices that are installed at a predetermined distance (for example, 1 Km) of the road, and are identified by unique IDs, and store information (the curvature of the road, radius information, and the like) on the road area that is covered by the road-side units 1, in addition to information (altitudes and latitudes) on the locations thereof, and broadcasts the information to the outside at a predetermined interval.

If the allowable speed calculation unit 25 receives information on latitudes, altitudes, and radii of a plurality of points from the road-side unit 1, it may calculate maximum allowable speeds at which the vehicle may be driven at maximum speeds at points and may provide the calculated maximum allowable speeds to the optimum speed calculation unit 30.

The maximum allowable speeds may be calculated based on values obtained by multiplying the radii R of a plurality of points and an allowable maximum lateral acceleration ay.

For example, the allowable speed calculation unit 25 calculates the maximum allowable speeds at the points using Equation 1 by which a lateral acceleration is obtained.

$$a_y = \frac{V^2}{R} \qquad \text{[Equation 1]}$$

In Equation 1, V denotes a maximum allowable speed, R denotes a radius, and ay denotes a lateral acceleration. Here, the radius R is provided by the road-side unit 1 and the allowable lateral acceleration ay is predetermined by the designer. Accordingly, the allowable speed calculation unit 25 obtains a maximum allowable speed at which the lateral acceleration ay is less than a predetermined value. For example, when the allowable maximum lateral acceleration ay is set to be 0.3 g, the allowable speed calculation unit 25 may obtain a maximum allowable speed when the lateral acceleration ay is less than 0.3 g.

For example, when the maximum lateral acceleration ay is set to be 0.3 g, the allowable speed calculation unit 25 may calculate the maximum allowable speed V in Equation 2.

$$V=\sqrt{0.3R} \qquad \text{[Equation 2]}$$

The optimum speed calculation unit 30 may calculate the target optimum speed of the vehicle using the maximum allowable speeds at the points provided by the allowable speed calculation unit 25.

The optimum speed calculation unit 30 may calculate an optimum speed such that the maximum allowable speed may not be exceeded, in consideration of the limits of the preset acceleration and deceleration, and a range within which the optimum speed may be changed, that is, the range of an inclination value of the change in speed or the acceleration/deceleration value is set in advance, in consideration of the limits of the acceleration and the deceleration.

Here, the acceleration and deceleration limit is set by measuring acceleration and deceleration sections in which the driver feels comfortable when the vehicle is accelerated and decelerated through experiments and limiting the maximum acceleration and decelerations of the sections. In general, because the maximum range in which the vehicle may be accelerated and decelerated according to the type and model of the vehicle, it is preferable to consider the maximum range.

In general, when the physical limit or driving convenience of a vehicle is considered, the upper limit of the acceleration that may be applied by the vehicle may be set to be about +0.1 g and the upper limit of the deceleration may be set to be about −0.3 g. In this case, the optimum speed calculation unit 30 calculates an optimum speed from a maximum allowable speed in a range that does not deviate from the acceleration and deceleration range.

The method of calculating the maximum allowable speed and the optimum speed will be described in more detail with reference to FIG. 5.

The control module 20 operates the wireless communication module 15 to control the wireless communication module 15 such that the wireless communication module 15 transmits and receives information to and from the road-side unit 1, and if information is not automatically provided from the road-side unit 1, a request for information on the number of points together with information on the altitudes, latitudes, and radii of the points may be made to the road-side unit 1 through the wireless communication module 15. The control module 20 may provide the information that is provided by the road-side unit 1 to the allowable speed calculation unit 25.

If the allowable speed calculation unit 25 calculates the maximum allowable speeds for the points, the control module 20 may compare the maximum allowable speeds for the adjacent points. That is, referring to FIG. 2, the maximum allowable speed for point 3 is provided, the control module 20 compares the maximum allowable speed with the maximum allowable speed for point 2. When the maximum allowable speeds of point 2 and point 3 are the same or are different by a degree that is less than a predetermined value in the comparison result, the control module 20 may control the maximum calculation unit 30 such that the maximum speed calculation unit 30 does not calculate the optimum speed. The function of the control module 20 is prepared against a case in which the road-side unit 1 provides information on a point other than the points where the radii thereof are changed. Accordingly, when the road-side unit 1 sends information only on a point where the radius thereof is changed, the control module 20 may not compare the maximum allowable speeds of the points.

The control module 20 may guide the driver such that the driver changes the speed of the vehicle to the corresponding optimum speed by displaying the optimum speed calculated by the optimum speed calculation unit 30 to the driver. Together, the control module 20 may automatically control the speed of the vehicle by providing a command signal to an engine control unit for automatically controlling the speed of the vehicle.

When the driver directly changes the speed of the vehicle, the control module 20 may display the optimum speed to the outside through a navigation system, a display unit, a Human Machine Interface (HMI), or the like, or may provide a voice signal to the driver. Then, the control module 20 guides the driver such that the vehicle reaches the optimum speed until the next point by displaying the optimum speed of the next point whenever the vehicle reaches the points.

Figure 3:
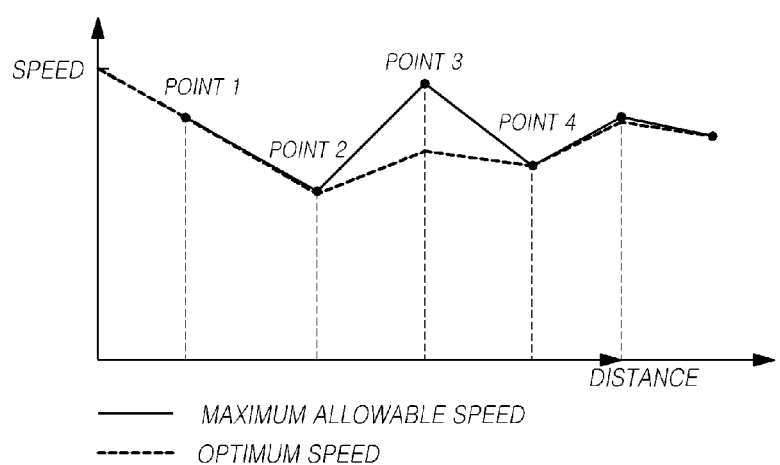
FIG. 3 is a graph depicting the maximum allowable speed and the optimum speed when maximum allowable speeds calculated on the center lines corresponding to the points of FIG. 2 are changed.

FIG. 3 is a graph depicting the maximum allowable speed and the optimum speed when the maximum allowable speeds calculated on the center lines corresponding to the points of FIG. 2 are changed.

As illustrated, when the maximum allowable speeds for the points are calculated, the speed changes of the points are set to be linearly changed. If the optimum speeds for the points are calculated, the speed changes of the points for reaching the optimum speeds may also be set to be changed linearly.

Accordingly, as illustrated in FIG. 3, when an optimum speed at one point is changed to an optimum speed at the next point, the control module 20 may generate a command signal such that the speed of the vehicle is linearly changed and may provide the command signal to an engine control unit.

Figure 4:
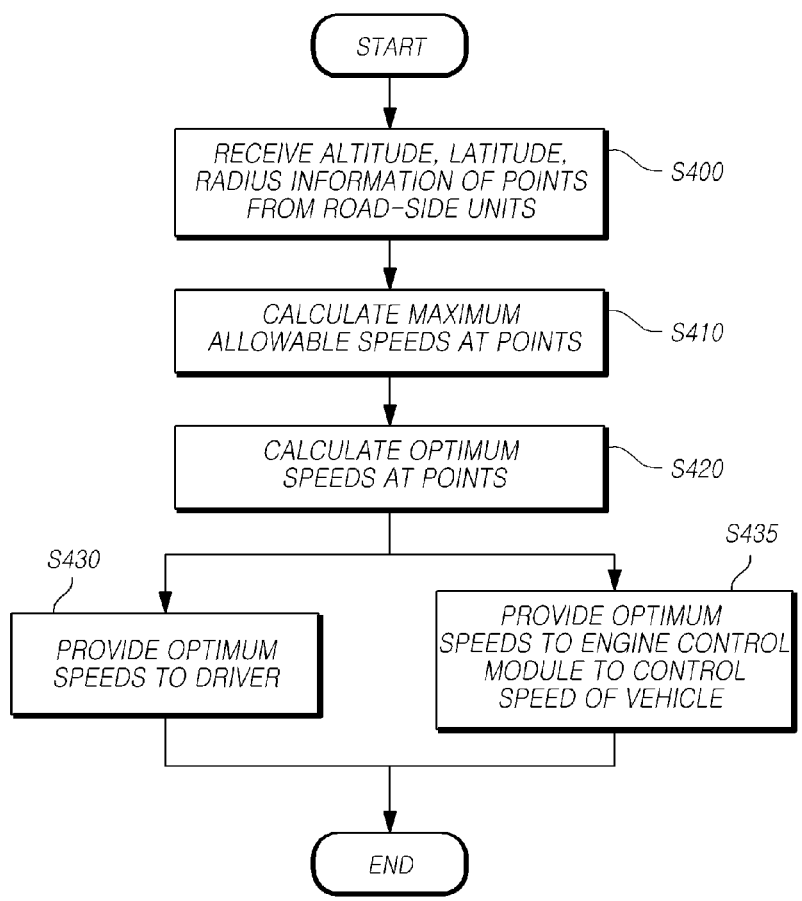
FIG. 4 is a flowchart illustrating a process of controlling speed in a curved road section through communication with a road-side unit in a speed control system for a curved road section of FIG. 1.

A process of controlling a speed in a curved road section through communication with the road-side unit 1 in the speed control system 10 in a curved road section will be described with reference to FIG. 4.

If the road-side unit 1 is detected and information at the points is not received by the road-side unit 1, the control module 20 may request information on the number of the road-side units 1 together with information of altitudes, latitudes, and radii from the road-side units 1 through the wireless communication module 15.

If the control module 20 receives the corresponding information from the road-side unit 1 (S400), the control module 20 provides the radius information to the allowable speed calculation unit 25, and calculates the maximum allowable speed of the vehicle of which the lateral acceleration is less than a predetermined value using the radius information of the points (S410).

If the allowable speed calculation unit 25 calculates the maximum allowable speeds for the points, the control module 20 compares the maximum allowable speeds at the points with the maximum allowable speeds at the adjacent points, and provides the corresponding maximum allowable speeds to the optimum speed calculation unit 30 only when the maximum allowable speed is changed in the comparison result to operate the optimum speed calculation unit 30. The process may be omitted when the road-side units 1 provide information only for the points where the radii thereof are changed.

The optimum speed calculation unit 30 calculates optimum speeds at points in consideration of the acceleration and deceleration limits of the vehicle (S420).

The calculated optimum speeds at the points are provided to the control module 20, and the control module 20 displays the optimum speeds to the outside so that the driver recognizes the optimum speeds according to the function of the vehicle (S430), or automatically controls the speed of the vehicle by providing the optimum speeds to the engine control module 20 of the vehicle (S435).

Figure 5:
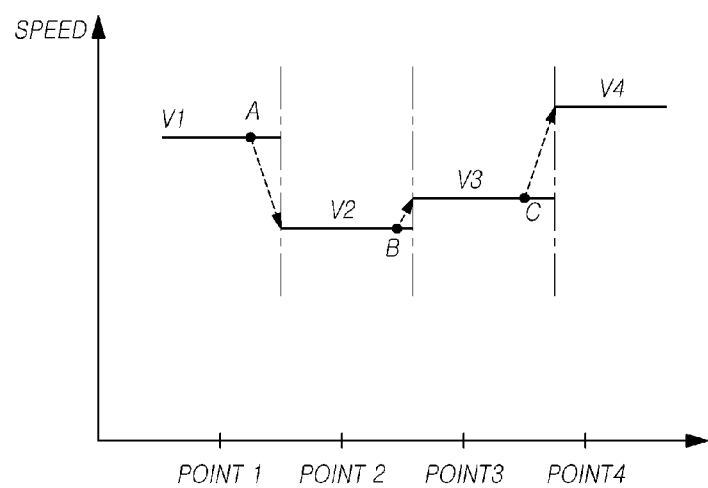
FIG. 5 is a graph depicting a change in the maximum allowable speeds and the optimum speeds calculated in road sections or at points.

FIG. 5 is a graph depicting a change in the maximum allowable speeds and the optimum speeds calculated in road sections or at points.

The solid line of FIG. 5 indicates a maximum allowable speed, and the dotted line of FIG. 5 indicates an optimum speed.

Assuming a road environment of FIG. 2, maximum allowable speeds for road sections between points are calculated based on location information and radius information of the points 1 to 4.

The maximum allowable speeds are constant values at the points, and are different at the points. Accordingly, as indicated by the solid line of FIG. 5, the maximum allowable speeds for several points or road sections are discrete values.

However, because the actual speed of the vehicle cannot be discretely changed, the optimum speeds are calculated such that the speed of the vehicle is continuously changed in the acceleration and deceleration range that considers the physical limit of the vehicle and the convenience of the driver.

As illustrated in FIG. 5, the maximum allowable speed on a road section near point 1 is determined to be V1 and the maximum allowable speed on a road section near point 2 is determined to be V2, and the two maximum allowable speeds are discontinuously changed.

Then, because the speed control system may calculate the maximum allowable speeds for the road sections in which the driver is going to be driven, using information from the road-side units, it may recognize that the maximum allowable speed is changed to V2 a predetermined time later while the vehicle is driven at point 1.

Accordingly, the speed control system calculates an optimum speed such that the vehicle starts to be decelerated at point A near point 1 so that the optimum speed, which is an actual target speed, may be continuously changed.

That is, the dotted line that starts at point A of FIG. 5 indicates optimum speed, and then the inclination of the dotted line should be within the acceleration and deceleration range (−0.3 g to 0.1 g) that is considered when the optimum speed is calculated.

In this way, the speed control system 10 according to the present invention receives curve information of a curved road section using the road-side units 1, calculates optimum allowable speeds at which the vehicle may be driven in the curve sections using the information, and calculates optimum speeds that do not exceed the maximum allowable speed, so that the vehicle can be stably driven in a curve section. Accordingly, the vehicle can be stably driven and the driver can feel safe and comfortable while the vehicle is driven.

In the above-mentioned embodiment of the present invention, the standard contents or standard documents are omitted to make the description of the specification brief and constitutes a part of the specification. Accordingly, it should be construed that the act of adding some contents of the standard contents and the standard documents to the specification or the claims falls within the scope of the present invention.

Although the embodiments of the present invention have been described for illustrative purposes, those skilled in the art will appreciate that various modifications, additions and substitutions are possible, without departing from the scope and spirit of the invention. Therefore, exemplary aspects of the present disclosure have not been described for limiting purposes. The scope of the present invention shall be construed on the basis of the accompanying claims in such a manner that all of the technical ideas included within the scope equivalent to the claims belong to the present invention

What is claimed is:

1. A speed control system for a curved road section, comprising:
   a wireless communication module that supports communication with road-side units and receives road information for a plurality of points on a curved road adjacent to the road-side units, from the road-side units;
   an allowable speed calculation unit that calculates maximum allowable speeds that are the highest speeds at which a vehicle is driven, for each of the plurality of points, using the road information;
   an optimum speed calculation unit that calculates optimum speeds of the vehicle, for each of the plurality of point, in an acceleration and deceleration range that is set in consideration of a predetermined acceleration and deceleration limit of the vehicle; and
   a control module that displays the optimum speeds calculated by the optimum speed calculation unit or provides the calculated optimum speeds to another control system in the vehicle such that the speed of the vehicle is controlled.

2. The speed control system of claim 1, wherein the road information at the plurality of points comprises at least one of information on the altitudes, latitudes, and radii of the curved road at the plurality of points.

3. The speed control system of claim 1, wherein the plurality of points is located within a predetermined radius from the road-side units, and the points are points where straight lines extending vertically from a location of a roadside where the radius of the road is changed towards the center of the road meet the center line of the road.

4. The speed control system of claim 1, wherein the allowable speed calculation unit calculates the maximum allowable speeds based on values obtained by multiplying the radii (R) of the plurality of points and an allowable maximum lateral acceleration (ay).

5. The speed control system of claim 2, wherein the radius information is indicated by (+) or (−) according to whether the plurality of roads is curved rightwards or leftwards and is provided by the road-side units.

6. The speed control system of claim 1, wherein the optimum speed calculation unit calculates the optimum speeds within a range of an inclination value of a speed change that is set in consideration of the acceleration and deceleration limit of the vehicle.

7. The speed control system of claim 1, wherein the optimum speed calculation unit calculates the optimum speeds such that the optimum speeds are continuously changed between two maximum allowable speeds.

8. The apparatus of claim 1, wherein the control module generates a command signal for controlling the driving of the vehicle such that an optimum speed is linearly changed from one point where the optimum speed thereof is calculated to another point.

9. The speed control system of claim 1, wherein the control module displays the optimum speeds at each of the points using at least one of an image signal and a voice signal.

10. A speed control method for a curved road section, comprising:
- receiving road information from the road-side units for a plurality of points on a curved road adjacent to road-side units;
- calculating maximum allowable speeds at each of the plurality of points;
- calculating optimum speeds of the vehicle, for each of the plurality of points, in an acceleration and deceleration range that is set in consideration of a predetermined acceleration and deceleration limit of the vehicle; and
- controlling the vehicle such that the speed of the vehicle is changed by displaying the optimum speeds or by providing the optimum speeds to another control system in the vehicle.

* * * * *